United States Patent [19]
Ferri et al.

[11] Patent Number: 5,286,096
[45] Date of Patent: Feb. 15, 1994

[54] ARRANGEMENT FOR ENHANCING THE BAIL-OFF FUNCTION OF BRAKE CYLINDER PRESSURES ON A RAILROAD LOCOMOTIVE

[75] Inventors: Vincent Ferri, Pittsburgh; Robert D. Dimsa, Elizabeth, both of Pa.

[73] Assignee: Westinghouse Air Brake Company, Wilmerding, Pa.

[21] Appl. No.: 929,048

[22] Filed: Aug. 13, 1992

[51] Int. Cl.$^5$ .............................................. B60T 13/68
[52] U.S. Cl. ........................................ 303/15; 303/16
[58] Field of Search ................... 303/3, 15, 16, 17, 18, 303/37, 38, 39, 47, 69, DIG. 3, DIG. 4

[56] References Cited

U.S. PATENT DOCUMENTS

| | | | |
|---|---|---|---|
| 4,306,752 | 12/1981 | Brandt | 303/15 |
| 4,509,801 | 4/1985 | Newton et al. | 303/36 X |
| 4,904,027 | 2/1990 | Skartar et al. | 303/DIG. 3 X |
| 5,090,780 | 2/1992 | Powell | 303/15 |
| 5,104,203 | 4/1992 | Ferri | 303/15 |
| 5,172,316 | 12/1992 | Root et al. | 303/20 X |
| 5,192,118 | 3/1993 | Balukin et al. | 303/15 |

Primary Examiner—Robert J. Oberleitner
Assistant Examiner—Kevin D. Rutherford
Attorney, Agent, or Firm—John B. Sotak

[57] ABSTRACT

An arrangement for enhancing a bail-off function a railway vehicle comprising, a non-recoverable bail-off circuit for supplying an output signal to a brake cylinder calculation circuit when a bail-off condition a freight operating mode, a drop in brake pipe pressure is present, and an emergency brake state is absent, a recoverable bail-off circuit for supplying an output signal to the brake cylinder calculation circuit when a bail-off condition and an emergency brake state is present, the brake cylinder calculation circuit supplying an automatic brake cylinder demand signal on one input of a relay valve emulation circuit and receiving an independent brake cylinder demand signal on another input of, the relay valve emulation circuit which supplies output signal to a feedback control circuit producing output signals which are supplied to an application valve and a release valve for controlling the level of air pressure in an air brake cylinder, and a transducer for sensing and feeding back a signal corresponding to the pressure in the air to the brake cylinder feedback control circuit so as to appropriately energize to control the application and release valves.

17 Claims, 4 Drawing Sheets

ARRANGEMENT FOR ENHANCING THE BAIL-OFF FUNCTION OF BRAKE CYLINDER PRESSURES ON A RAILROAD LOCOMOTIVE

FIELD OF THE INVENTION

This invention relates to an improved method of bailing off the locomotive brake cylinder pressure to correspond to an independent brake handle position and, more particularly, to a unique electropneumatic bail-off system for reducing the brake cylinder pressure on a railroad locomotive to an independent brake pressure level and for restoring the brake cylinder pressure on the locomotive to its original brake cylinder pressure level which existed prior to the bail-off request.

BACKGROUND OF THE INVENTION

Presently, a railway engineer or operator has the ability to jointly control the train brakes by manipulating an automatic brake handle and to separately control the locomotive brakes by operating an independent brake handle. For example, during an automatic braking operation, the engineer in the lead locomotive appropriately moves the automatic brake handle into a desired position in a brake range so as to cause a reduction in the brake pipe pressure. When the brake pipe pressure is reduced, the brakes on the railway vehicles in the train, as well as the brakes on the locomotive consist, are applied by introducing a predetermined ratio of air pressure to the brake cylinders. When the pressure reaches the requested brake command level, the brake equipment will go into a lap condition to maintain the braking effort constant. Now if a further increase of braking effort on the entire train is desired, the operating engineer again causes a reduction of air pressure in the brake pipe by movement of the automatic brake handle which, in turn, results in an increase of air pressure in the brake cylinders. Now when the brake cylinder pressure corresponds to the requested brake command, the brake equipment will again go into a lap condition to maintain a constant braking effort. Under certain operating conditions, it may be advantageous to independently control the pneumatic pressure in the brake cylinders on the locomotive consist from the pneumatic pressure in the brake cylinders on the trailing railway cars of the train. In such a situation, the brakes on the locomotives may be separately controlled by manipulating the independent brake handle. Thus, the brake pressure in the brake cylinders of the locomotive consist may be independently increased or decreased to selectively control the braking effort. That is, if the engineer requires different braking characteristics on the locomotive, it was possible to bail-off the brakes on the locomotive by depressing the independent brake handle. In the past, if the engineer bails off and reduces the brake cylinder pressure on the locomotive to zero pounds per square inch (0 psi), and then initiates a further reduction of brake pipe pressure, the new level of brake pipe pressure only returns to a value consistent with the most recent brake pipe reduction. Thus, each depression and release of the bail-off handle can eventually result in a zero pressure to exist in the brake cylinders on the locomotive consist of the train. It will be appreciated that such a condition is not only undesirable, but is also unsafe since the locomotive brakes are inoperable.

OBJECTS AND SUMMARY OF THE INVENTION

Accordingly, it is an object of this invention to provide a unique bail-off enhancing system for the brake cylinder pressure of a railway locomotive.

Another object of this invention is to provide an improved enhanced bail-off arrangement for restoring the brake cylinder pressure of a locomotive to the same brake cylinder pressure existing on a train after the bail-off is terminated.

A further object of this invention is to provide a novel bail-off enhancement arrangement for reducing the brake cylinder pressure on the locomotive to correspond to the position of the independent brake handle and for restoring the brake cylinder pressure on the locomotive to the position of the automatic brake handle.

Yet another object of this invention is to provide an arrangement for enhancing a bail-off function of the brake cylinder pressure of a railway vehicle comprising, a non-recoverable bail-off logic means for supplying an output signal to a brake cylinder calculation means when a bail-off condition is present, a freight operating mode is in effect, a rise in brake pipe pressure is present, and an emergency brake state is absent, a recoverable bail-off logic means for supplying an output signal to the brake cylinder calculation means when a bail-off condition is present and an emergency brake state is present, the brake cylinder calculation means supplying an automatic brake cylinder demand signal on one input of a relay valve emulation calculation means and receiving an independent brake cylinder demand signal on another input of the relay valve emulation calculation means, the relay valve emulation calculation means supplying an output signal to a brake cylinder feedback control means for producing electrical output signals which are supplied to an electromagnetic application valve and an electromagnetic release valve for controlling the level of air pressure in an air brake cylinder, and a pneumatic-to-electrical transducer for sensing and feeding back an electrical signal corresponding to the pressure in the air brake cylinder to the brake cylinder feedback control means so as to appropriately energize and deenergize the electromagnetic application and release valves.

Still another object of this invention is to provide an enhanced electropneumatic bail-off system comprising, a direct release and non-recoverable bail-off logic circuit connected to a manual bail-off terminal, a dynamic bail-off terminal, a freight/passenger mode terminal, a brake pipe indication terminal, and an emergency brake terminal, a recoverable bail-off logic circuit connected to the manual bail-off terminal, the dynamic bail-off terminal, and said emergency brake terminal, a brake cylinder limit and request calculation circuit connected to the output of the direct release and nonrecoverable bail-off logic circuit, the output of the recoverable bail-off logic circuit, the brake pipe indication terminal, a J-relay valve emulation calculation circuit connected to the output of the brake cylinder limit and request calculation circuit and also connected to an independent brake cylinder demand terminal, a brake cylinder feedback control circuit connected to the output of the J-relay valve emulation calculation circuit, an electromagnetic application valve connected to the brake cylinder feedback control circuit, an electromagnetic release valve connected to the brake cylinder feedback control circuit, the electromagnetic application and release valves controlling the pressure in a pneumatic brake cylinder, a pressure sensing transducer for monitoring the pressure in the pneumatic and for feeding back an electrical signal which is proportional to the pressure in the pneumatic brake cylinder to the brake cylinder feedback control circuit so that the electromagnetic application valve causes an increase in pressure in the pneumatic brake cylinder and so that the electromagnetic release valve causes a decrease in pressure in the pneumatic brake cylinder.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
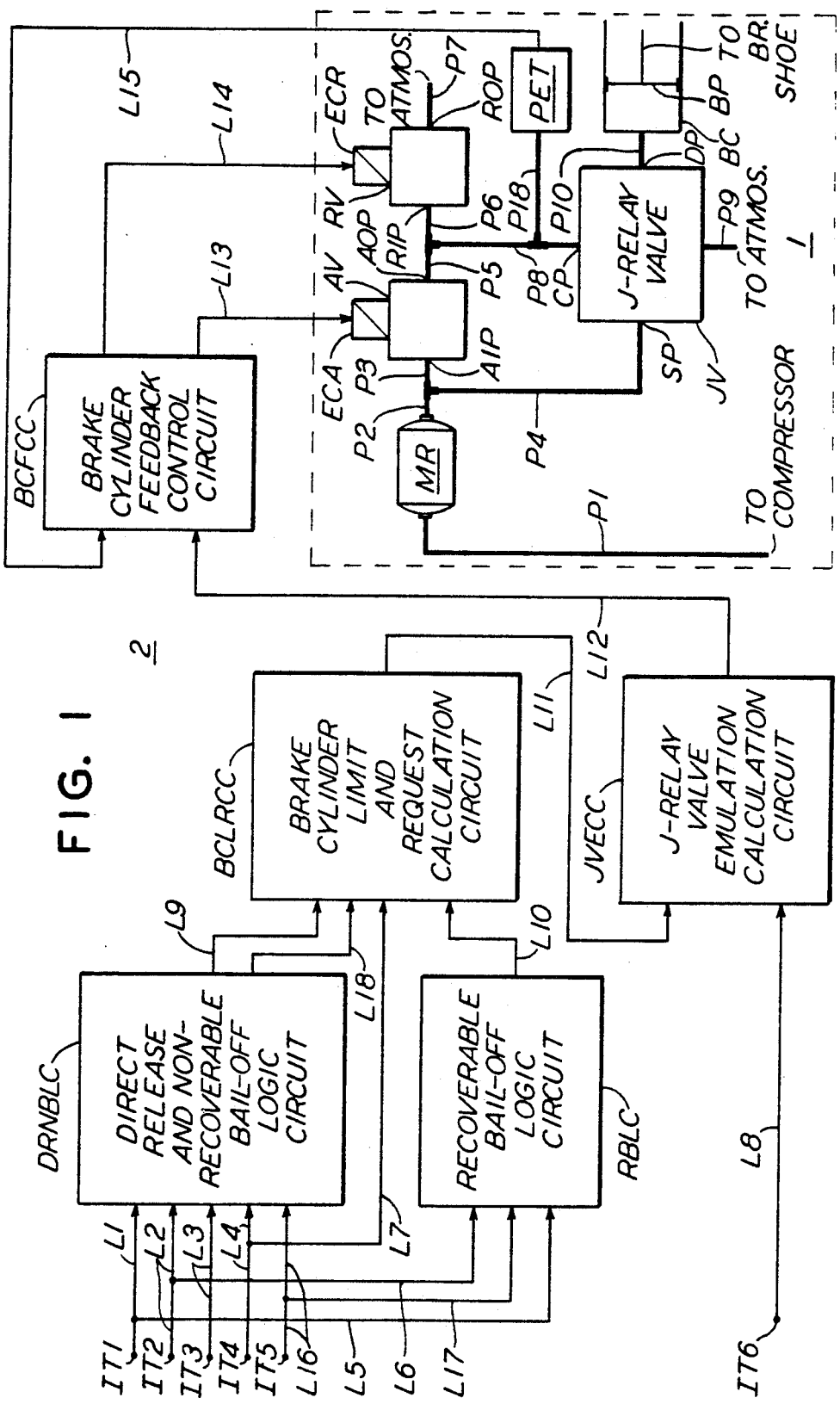
FIG. 1 is a diagrammatic illustration of an electropneumatic brake control system incorporating the unique features of the present invention.

Referring now to the drawings, and in particular to FIG. 1, there is shown a portion of an electropneumatic brake control system for a railway vehicle or locomotive consist which may include one or more self-propelled vehicles. It will be seen that the brake control system employs a plurality of electronic circuits which are interfaced to the pneumatic brake equipment carried by a railway locomotive.

Figure 4:
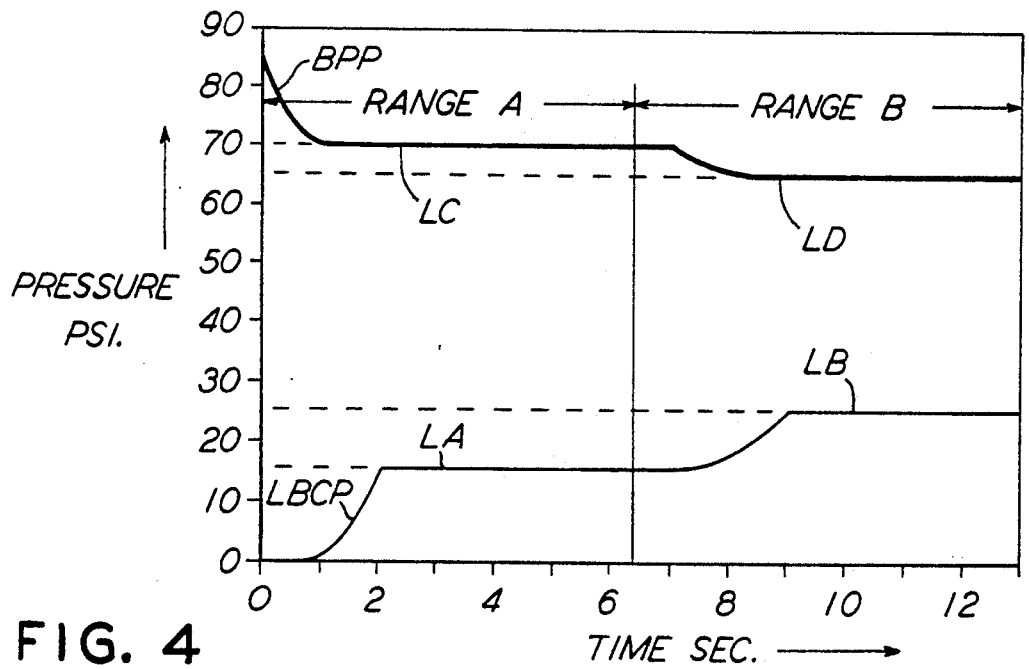
FIGS. 4 and 5 are graphical representations of the response curves of the brake pipe pressure and the locomotive brake cylinder pressure of the prior art system without bail-off and with bail-off, respectively.
Figure 5:
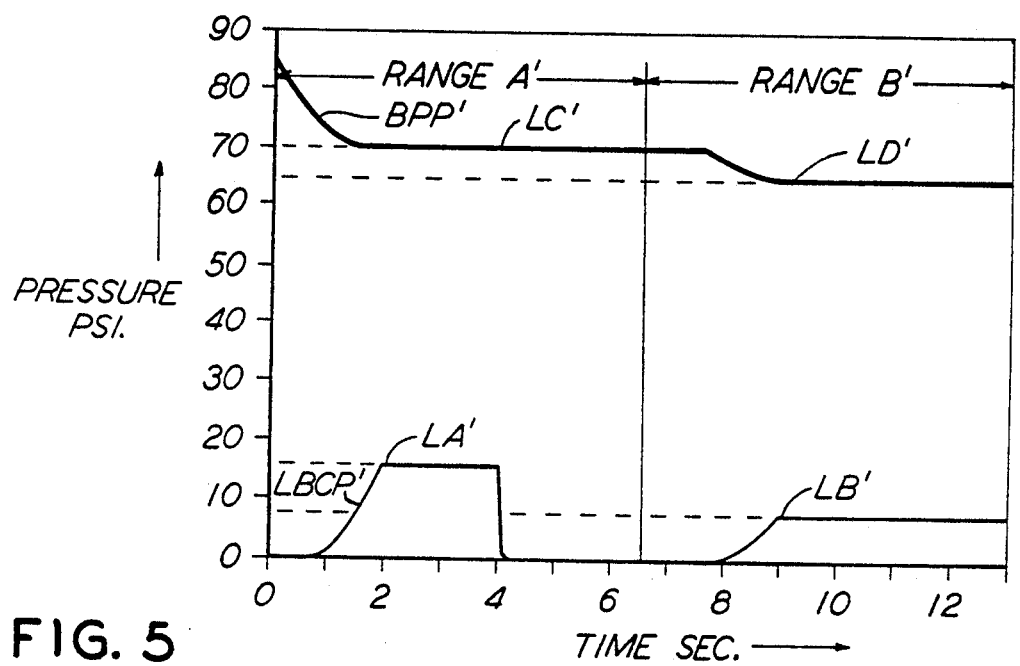

The operation of a conventional or operating pneumatic railway locomotive brake control system may be more clearly and better understood with reference to FIG. 4 which graphically represents an automatic brake application without bail-off while FIG. 5 which graphically represents an automatic brake application with bail-off. Referring now to FIG. 4, it will be seen that the upper broad line curve BPP represents the brake pipe pressure while the lower narrow line curve LBCP represents the locomotive brake cylinder pressure. Let us now assume that an automatic brake application is desired in which case the engineer moves the automatic brake handle into the braking range. Accordingly, the brake pipe pressure is reduced in proportion to the amount of movement of the automatic brake handle. As the brake pipe pressure is reduced, the brakes on all the cars of the train as well as on the locomotive consist are applied according to predetermined ratio, as shown in range A in FIG. 4. It will be seen that the brake equipment will eventually go into a lap condition LC so as to maintain the braking effort at a constant level LA. Now if the engineer desires to further increase the braking effort of the train, he will initiate a further brake pipe reduction as shown by curve LD in range B of FIG. 4.

Again, the brake equipment will eventually go into a lap condition so that an increased braking effort is exerted as shown by curve portion LB in range B of FIG. 4. It will be appreciated that the engineer may continue to reduce brake pipe pressure in order to increase the braking effort on the entire train.

Referring now to FIG. 5, it will again be assumed that an automatic brake application is desired. Now as the engineer moves the automatic brake handle into a braking position, the brake pipe pressure follows the curve BPP' and the locomotive brake cylinder pressure follows curve LBCP'. Now as the brake equipment goes into a lap condition LC' in range A', the locomotive brake cylinder pressure LBCP' will level off and cause the exertion of a constant braking effort as shown by the curve portion LA'in range a'. Let us now assume that the engineer desires to bail-off or reduce the brake cylinder pressure on the locomotive to a zero (0) pressure level. In existing 26 and 30 type railway brake equipment, the bail-off operation is initiated by depressing the independent brake handle in the cab of the lead locomotive. As shown, the depression of the independent brake handle causes the locomotive brake cylinder pressure to fall to a zero (0) pressure level at the four second (4 sec.) point in range A'. The pressure remains at 0 psi until the engineer again calls for a reduction of the brake pipe pressure in range B'. However, it will be seen that the second brake pipe pressure reduction only restores the locomotive brake cylinder pressure to a level LB' in range B'. The brake cylinder pressure level LB' is substantially less than the initial brake cylinder pressure level LA' and is markedly under the pressure level LB shown in FIG. 4. That is, the second reduction of brake pipe pressure only causes an increase in the brake cylinder pressure according to a predetermined ratio, and accordingly the new level of locomotive brake cylinder pressure would only achieve a value consistent with the most recent brake pipe reduction, namely, level LB' as shown in FIG. 5. Thus, it will be appreciated that currently existing and available pneumatic brake control equipment includes a selective operable mechanism which allows an engineman to bail-off the pressure in the brake cylinders of the locomotive during an emergency mode of operation. The given amount of air that is exhausted is equal to that which was supplied to the brake cylinders by operation of the automatic brake handle, and the air pressure is recovered once the bail-off command is terminated since the control valve piston stack remains in the brake application position. However, due to the inherent deficiencies in the pneumatic brake equipment, the level of the air pressure which is reapplied to the brake cylinders is less than that which was previously applied to the brake cylinders. Each successive actuation and release of the bail-off handle will result in a progressively less air pressure which is reapplied to the brake cylinders. In operation, the brake cylinder air pressure could reach a zero (0) level if the bail-off is repeatedly initiated by the engineman since the control reservoir pressure is effectively reduced during each bail-off cycle. It will be appreciated that a zero pressure condition is a wholly unacceptable situation since the engineman cannot initiate a brake application on the locomotive.

Accordingly, the subject application provides an enhanced electropneumatic brake control arrangement which alleviates the deleterious brake pressure reduction effects which previously occurred during bail-off operations.

Referring now to FIG. 1 of the drawings, there is shown a diagrammatically illustration of an improved electronically controlled pneumatic brake system for a railroad locomotive. The electropneumatic brake control arrangement includes a pneumatic operated control portion 1 located on the lead locomotive of a railway train. The air brake control portion 1 includes a main reservoir MR which is connected by conduit or pipe P1 to a pressure supply compressor (not shown) which maintains the pressure at a desired psi level. The output of the main reservoir MR is connected to the inlet port AIP of an application magnet valve AV via conduits or pipes P2 and P3. The output of the main reservoir MR is also connected by conduits or pipes P2 and P4 to the supply port SP of a J-type of relay valve JV. As shown, the outlet port AOP of the application magnet valve AV is connected to the inlet port RIP of a release magnet valve RV via conduits or pipes P5 and P6. The release magnet valve RV includes an outlet port ROP which is connected to atmosphere via conduit or pipe P7. As shown, the pipe P5 is also connected to the control port CP of the J-relay valve JV via a conduit or pipe P8. The J-relay valve JV is exhausted to atmosphere via pipe or conduit P9 and a delivery port DP of J-relay valve JV is connected to an air brake cylinder BC via pipe or conduit P10. The brake cylinder BC controls the movement of the piston BP which effectively controls the brake shoes relative to the wheels of the railway vehicle. Thus, the application of the brakes occurs when the brake cylinder BC is pressurized, and the release of the brakes takes place when the pressure in the cylinder BC is exhausted to atmosphere.

Let us now turn to the electronic portion generally characterized by number 2 of the electropneumatic brake control system for railway vehicles or locomotives. As shown, the electronic portion 2 includes a direct release and non-recoverable bail-off logic circuit DRNBLC, a recoverable bail-off logic circuit RBLC, a brake cylinder limit and request calculation circuit BCLRCC, a J-relay valve emulation calculation circuit JRVECC, and a brake cylinder feedback control circuit BCFC which is electrically interfaced or interconnected to the pneumatic operating portion 1.

It will be noted that one input of five (5) inputs of the direct release and non-recoverable bail-off logic circuit DRNBLC is connected from terminal IT1 via lead L1 while a second input of the direct release and non-recoverable bail-off logic circuit DRNBLC is connected to terminal IT2 via lead L2. The third input of the direct release and non-recoverable bail-off logic circuit DRNBLC is connected to terminal IT3 via lead L3 while the fourth input of the direct release and non-recoverable bail-off logic circuit DRNBLC is connected to terminal IT4 via lead L4. The fifth input of the direct release and non-recoverable bail-off logic circuit DRNBLC is connected to terminal IT5 via lead L16. It will be seen that terminals IT2, IT3, and IT5 are connected to the three (3) inputs of the recoverable RBLC via leads L1 and L5, leads L2 and L6, and leads L16 and L17, respectively, while the terminal IT4 is connected to one of the three (3) inputs of the brake cylinder limit and request calculation circuit BCLRCC via leads L4 and L7.

The logic signal developed on input terminal IT1 is indicative of whether or not a manual bail-off flag is present. For example, the presence of a manual bail-off flag may be represented by a high or a logical "1" signal while the absence of a manual bail-off flag may be represented by a low or logical "0" signal. The logic signals may be controlled by an ON-OFF switch, which is conditioned by the independent brake handle being in or out of a bail-off position. It will be appreciated that the logic signal developed on input terminal IT2 is indicative of whether or not a dynamic bail-off flag is present. For example, the presence of a dynamic bail-off flag may be represented by a high or logical "1" signal while the absence of a dynamic bail-off flag may be represented by a low or a logical "0" signal. The logic signals are developed by appropriate dynamic brake monitoring circuitry which is provided and supplied by the locomotive builder. It will be understood that the logic signal appearing on input terminal IT3 is either a freight mode flag signal or a passenger mode flag signal. In practice, the freight mode flag may be represented by a high or a logical "1" signal, while the passenger mode flag may be represented by a low or a logical "0" signal. The particular operating mode is preselected by actuating a switch prior to allowing the locomotive to be placed in revenue service. As shown, the electrical control signal indicating the brake pipe pressure is developed on input terminal IT4. The logic signal appearing on input terminal IT5 is dependent upon the condition of the emergency brake status. If the emergency brake is "ON", a high or a logical "1" is developed on terminal IT5, and if the emergency brake is "OFF", a low or a logical "0" appears on terminal IT5. Finally, the electrical control signal representing the brake demand value for a given independent brake request is developed on an input terminal IT6 and is conveyed by lead L8 to one input of a J-relay valve emulation calculation circuit JVECC which will be described hereinafter.

Figure 2:
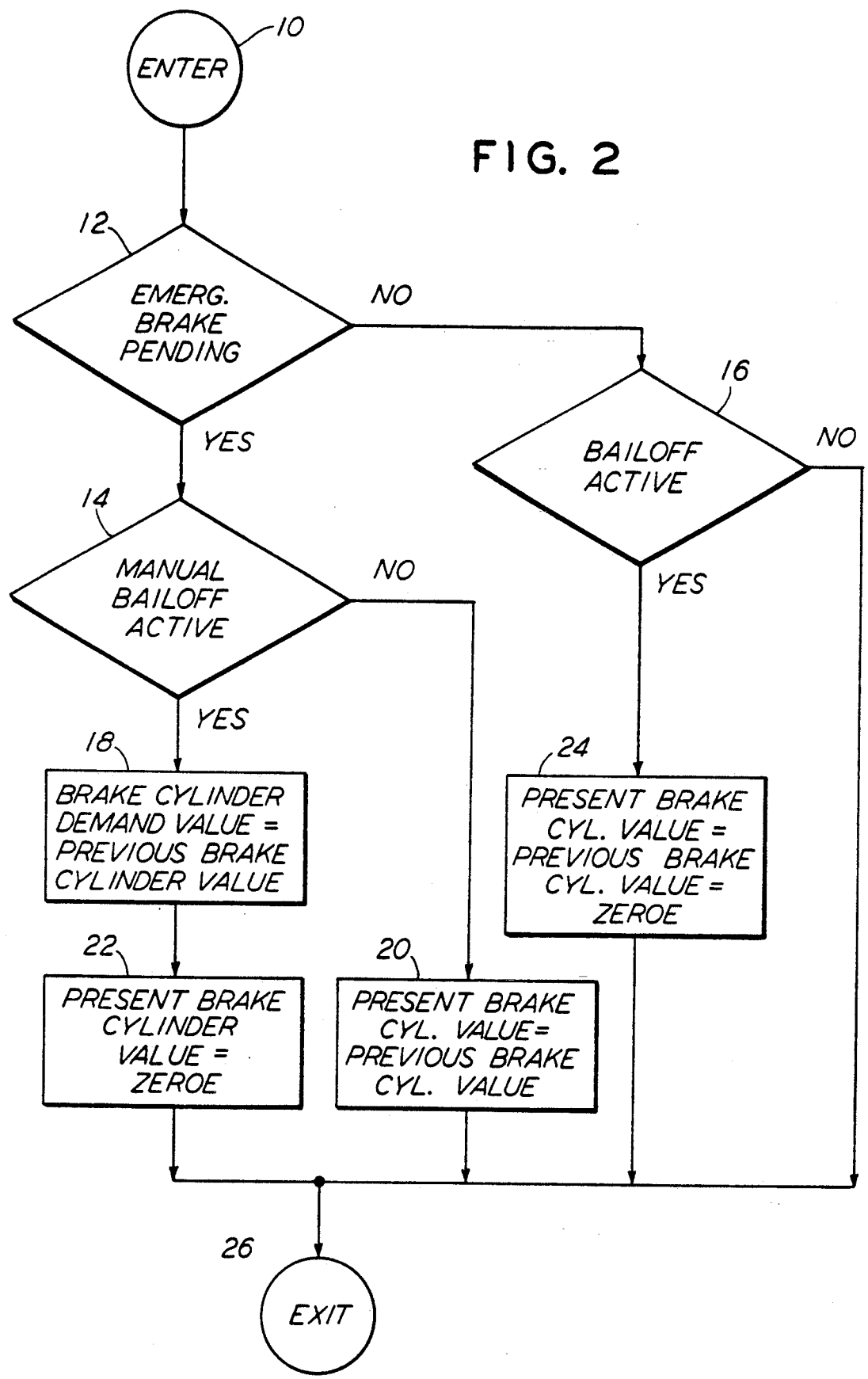
FIG. 2 is a flow chart which explains the operation of the air brake system of FIG. 1 and the operation that the microprocessor executes in the present invention.

It will be seen that the second input of the brake cylinder limit and request calculation circuit BCLRCC is connected to the output of the direct release and non-removable bail-off logic circuit via lead L9, and that the third input of the brake cylinder limit and request calculation circuit BCLRCC is connected to the output of the recoverable bail-off logic circuit RBLC via lead L10. It will be observed that the output of the brake cylinder limit and request calculation circuit BCLRCC is connected to another input of the J-relay valve emulation calculation circuit JVECC via lead L11. The electrical control signal appearing on lead L11 is representative of the brake demand value for a particular automatic brake request. The emulation calculation circuit JVECC electronically simulates the functional operation of a specific type of J-relay valve in response to automatic brake cylinder command requests and independent brake cylinder commands as shown and described in U.S. Pat. No. 5,104,203, issued May 14, 1992, entitled "Arrangement for Emulating a J-Type Relay Air Valve Usable in a Railway Braking System", and assigned to the assignee of the present invention. In operation, the emulator JVECC takes the automatic and independent brake cylinder commands and calculates the two input commands in accordance with the compile time constants, as shown in FIG. 2 of the above U.S. Patent, which have been selected. The calculated output signal is conveyed to one input of the brake cylinder feedback control circuit BCFCC via lead L12. As shown, the output of the brake cylinder feedback control circuit BCFCC is connected to electrical coils or solenoids of the application and release valves AV and RV by leads L13 and L14, respectively. The valves AV and RV are preferable spring-biased, two-way multi-purpose devices which provide the required electropneumatic interface. The electropneumatic or electromagnetic application and release valves each includes an open and a closed position. When the application magnet valve AV is deenergized, the biasing spring causes the blocking off of the fluid flow path from inlet port AIP to output port AOP while, when the application magnet valve AV is energized, a flow path is established between the inlet port AIP and the outlet port AOP. Conversely, when the release magnet valve RV is deenergized, the biasing spring causes a fluid flow path to be established between the inlet port RIP and the outlet port ROP, and when the release magnet valve RV is energized, the flow path is blocked off from the inlet port RIP to the outlet port ROP. It will be seen that a pneumatic-to-electric transducer PET is connected to pipe P8 via conduit or pipe P18 and effectively senses the pneumatic pressure supplied to the control port CP of J-relay valve JV. The transducer PET conveys an electrical feedback signal to the other input of the brake cylinder feedback control circuit BCFCC via lead L15.

Figure 3:
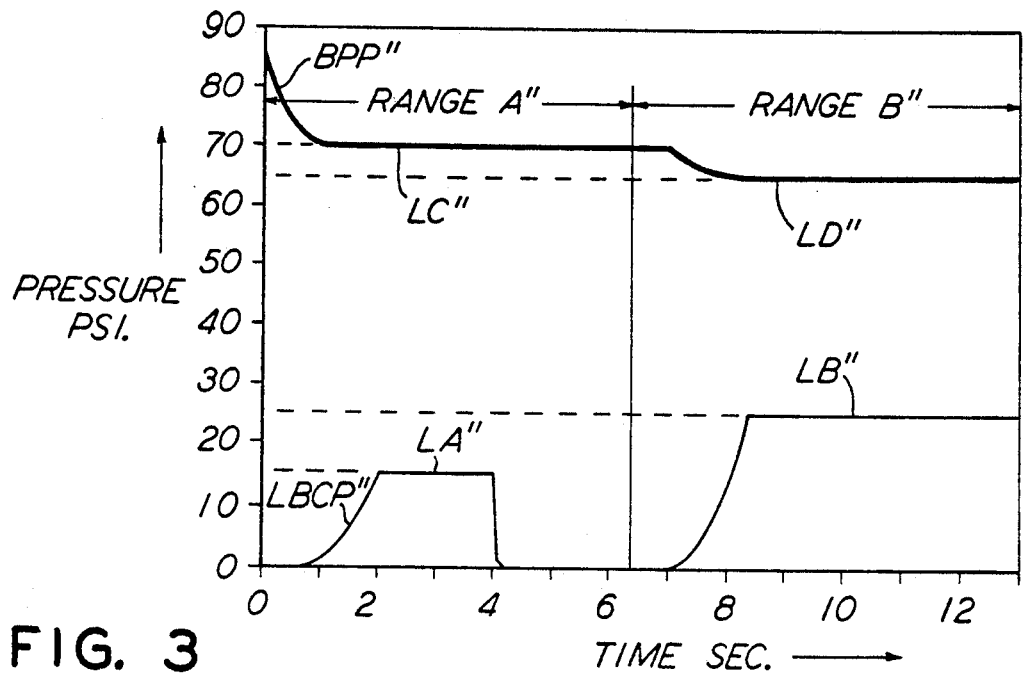
FIG. 3 is a graphical illustration of the brake pipe pressure and the locomotive brake cylinder pressure which will be useful in better understanding the operation of the present invention.

The brake cylinder pressure enhancing operation of the present invention may be more clearly understood by reference to FIG. 3 which graphically illustrates the brake pipe pressure curve BPP" along with the accompanying locomotive brake cylinder curve LBCP". As previously mentioned, air pressure is applied to the brake cylinders any time a drop in pressure occurs within the brake pipe of the railroad locomotive. As shown in FIG. 3, when an engineman initiates a pressure reduction, the brake pipe follows the curve BPP". As the brake pipe pressure drops, the brake cylinder pressure rises, and eventually the brake pipe pressure levels off to LC", as shown by range A". It will be seen that the brake cylinder pressure stabilizes and also levels off as shown by LA" at approximately 16 psi. It will be understood that the leveling-off value LA" is dependent upon the amount of brake pipe pressure reduction. Once the brake cylinder pressure level LA" is calculated, it is stored in memory in a storage register which may be included in the brake cylinder limit and request calculation circuit BCLRCC. The brake cylinder pressure curve LBCP' remains constant at level LA" until the engineman desires to bail-off the air pressure in the brake cylinders of the locomotive. Again, let us assume that the engineman initiates a bail-off condition at 4 seconds so that the locomotive brake cylinder pressure is effectively and almost immediately drops to a zero pressure by energizing release valve RV to vent to atmosphere as shown in range A". However, the pressure value in memory is not modified whenever the bail-off is actuated even though the pressure is removed from the brake cylinders. The cylinder pressure will remain at 0 psi until another brake pipe reduction is initiated by the engineman a shown in range B". The initiation of the second brake pipe reduction causes the locomotive brake cylinder pressure to begin to rise. While the second brake pipe pressure reduction only results in approximately an 8 psi increase in brake cylinder pressure, the new total brake cylinder pressure level LB" is approximately 24 psi since the 8 psi is added to the initial 16 psi which was stored in memory. That is, once the bail-off is terminated, the pressure in the brake cylinder BC is replenished by the energization of the application valve AV which causes the J-relay valve JV to build up the pressure. The pressure build-up continues until the transducer FET signals the brake cylinder feedback control circuit BCFCC that the brake pressure BC is at level LB". Under this condition, the application and release valve AV and RV go into a lap position to maintain the pressure level at LB". Thus, the brake cylinder pressure in the locomotive is the same pressure level as that of the entire train. It will be appreciated that a direct release function is capable in the present system. In order to eliminate all of the air pressure that was applied to the brake cylinders due to a drop in the brake pipe pressure, it is required that:

1. The brake pipe pressure must be increased by 2 psi or greater, and
2. The system must be conditioned to be operating in a freight mode.

Turning now to the flow chart of FIG. 2, it will be seen that a sequence of operations is initiated by a start signal emanating from the ENTER block 10. As shown, the start signal is fed to a decision block 12 which outputs a "YES" if an emergency brake is pending and outputs a "NO" if an emergency brake is not pending. The "YES" output of decision block 12 is fed to a decision block 14 while the "NO" signal of decision block 12 is fed to a decision block 16. The decision block 14 outputs a "YES" if a manual bail-off is active, and outputs a "NO" if a manual bail-off is not active. The "YES" output of the decision block 14 is fed to block 18 which determines if the brake cylinder demand value is equal to the previous brake cylinder value, while the "NO" output of the decision block 14 is fed to block 20 which determines if the present brake cylinder value is equal to the previous brake cylinder value. The output of block 18 is fed to block 22 which determines if the present brake cylinder value is equal to zero (0). As noted above, the decision block 16 outputs a "YES" which is fed to block 24 which determines if the present brake cylinder value is equal to the previous brake cylinder value and, in turn, equal to zero (0). When the decision block 16 determines that the bail-off is not active it outputs a "NO" which along with the outputs of blocks 22, 20 and 24 are fed to exit block 26 which terminates the operating sequence and the system is ready to process a subsequent bail-off request.

Thus, it will be appreciated that the enhancing bail-off feature of the present invention allows the locomotive brake cylinder pressure to be augmented to an appropriate level which is consistent with the brake cylinder pressures of the remainder of the railroad train. It will be understood that when the bail-off request is completed, the locomotive brake cylinder pressure will remain either at zero (0) psi or at a pressure level which conforms to the position of the independent brake handle. Now when a further reduction of brake pressure is initiated, the locomotive brake cylinder pressure will be raised to an appropriate level LB" which is the total reduction in brake pipe pressure from the original reference pressure. The operation is effectively carried out in that the requested brake pipe pressure is referenced to a value which is stored in memory which represents the full brake pipe pressure. All the calculations made to compute the level of locomotive brake request are made with respect to the reference value. It will be appreciated that once the brake cylinder pressure is calculated and is stored in memory, the state of the bail-off handle, the type of braking in force, and value of the feedback signal received from brake cylinder transducer are monitored in order to determine if the calculated pressure is to be applied or removed from the brake cylinders. If an emergency mode of operation is in force and a bail-off command is pending, any pressure applied to the brake cylinders due to a drop in brake pipe pressure is removed. The pressure will be reapplied once the bail-off command is terminated. As noted above, the value stored in memory is not modified throughout the sequence of operation so that the full pressure is reapplied to the brake cylinders. Thus, the realtime feedback control is utilized to monitor and correct for any variations in the brake cylinder pressure. Thus, the magnet valves, the pressure transducer, and the logic calculation circuits determine when and how to apply or remove pressure. The pressure reapplied is determined by the value calculated and stored in memory. Thus, value is compared to the feedback value received from the pressure transducer located in the brake cylinder. It will be appreciated that the pressure is removed from the cylinders when a bail-off command is instituted but the value in memory is not modified. Once the bail-off is terminated, the calculated value stored in memory is compared to the value received by the pressure transducer, and if the transducer value is less than that stored in memory, the charge magnet valve is actuated until the appropriate pressure is achieved. Once the pressure matches, the charge magnet is turned off. This type of control positively ensures that the pressure applied is always the proper value regardless of whether or not a bail-off command is implemented. The system offers the reliable and predictable control of the brake cylinder pressure during an emergency mode of braking which is not currently available on existing equipment.

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and charges may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art and, accordingly, it is understood that the present invention should not be limited to the exact embodiment shown and described, but should be accorded the full scope and protection of the appended claims.

What we claim is:

1. An arrangement for enhancing a bail-off function of brake cylinder pressure of a railway vehicle comprising, a non-recoverable bail-off logic means for supplying an output signal to a brake cylinder calculation means when a bail-off condition is present, a freight operating mode is in effect, a drop in brake pipe pressure is present, and an emergency brake state is absent, a recoverable bail-off logic means for supplying an output signal to the brake cylinder calculation means when a bail-off condition is present and an emergency brake state is present, the brake cylinder calculation means supplying an automatic brake cylinder demand signal on one input of a relay valve emulation calculation means and receiving an independent brake cylinder demand signal on another input of the relay valve emulation calculation means, the relay valve emulation calculation means supplying an output signal to a brake cylinder feedback control means for producing electrical output signals which are supplied to an electromagnetic application valve and an electromagnetic release valve for controlling the level of air pressure in an air brake cylinder, and a pneumatic-to-electrical transducer for sensing and feeding back an electrical signal corresponding to the pressure in the air brake cylinder to the brake cylinder feedback control means so as to appropriately energize and deenergize the electromagnetic application and release valves.

2. The arrangement for enhancing a bail-off function of the brake cylinder pressure of a railway vehicle as defined in claim 1, wherein said bail-off condition is manually initiated by an engineman.

3. The arrangement for enhancing a bail-off function of the brake cylinder pressure of a railway vehicle as defined in claim 1, wherein said bail-off condition is dynamically actuated.

4. The arrangement for enhancing a bail-off function of the brake cylinder pressure of a railway vehicle as defined in claim 1, wherein each of said electromagnetic application and release valves is a spring-biased two-way valve device.

5. The arrangement for enhancing a bail-off function of the brake cylinder pressure of a railway vehicle as defined in claim 1, wherein said relay valve emulation calculation means simulates operating functions of a J-type relay valve.

6. The arrangement for enhancing a bail-off function of the brake cylinder pressure of a railway vehicle as defined in claim 1, wherein said electromagnetic application valve is energized to increase the brake cylinder pressure.

7. The arrangement for enhancing a bail-off function of the brake cylinder pressure of a railway vehicle as defined in claim 1, wherein said electromagnetic release valve is de-energized to decrease the brake cylinder pressure.

8. The arrangement for enhancing a bail-off function of the brake cylinder pressure of a railway vehicle as defined in claim 1, wherein said brake cylinder calculation means is capable of storing the brake cylinder pressure.

9. An enhanced electropneumatic bail-off system comprising, a direct release and non-recoverable bail-off logic circuit connected to a manual bail-off terminal, a dynamic bail-off terminal, a freight/passenger mode terminal, a brake pipe indication terminal, and an emergency brake terminal, a recoverable bail-off logic circuit connected to the manual bail-off terminal, the dynamic bail-off terminal, and said emergency brake terminal, a brake cylinder limit and request calculation circuit connected to the output of the direct release and non-recoverable bail-off logic circuit, the output of the recoverable bail-off logic circuit, the brake pipe indication terminal, a J-relay valve emulation calculation circuit connected to the output of the brake cylinder limit and request calculation circuit and also connected to an independent brake cylinder demand terminal, a brake cylinder feedback control circuit connected to the output of the J-relay valve emulation calculation circuit, an electromagnetic application valve connected to the brake cylinder feedback control circuit, an electromagnetic release valve connected to the brake cylinder feedback control circuit, the electromagnetic application and release valves controlling pressure in a pneumatic brake cylinder, a pressure sensing transducer for monitoring the pressure in the pneumatic brake cylinder and for feeding back an electrical signal which is proportional to the pressure in the pneumatic brake cylinder to the brake cylinder feedback control circuit so that the electromagnetic application valve causes an increase in pressure in the pneumatic brake cylinder and so that the electromagnetic release valve causes a decrease in pressure in said pneumatic brake cylinder.

10. The enhanced electropneumatic bail-off system as defined in claim 9, wherein said brake cylinder limit and request calculation circuit is capable of storing the brake cylinder pressure.

11. The enhanced electromagnetic bail-off system as defined in claim 9, wherein said manual bail-off terminal exhibits a logical "0" during the presence of bail-off and exhibits logical "0" during the absence of bail-off.

12. The enhanced electropneumatic bail-off system as defined in claim 11, wherein said dynamic bail-off terminal exhibits a logical "1" during the presence of bail-off and exhibits a logical "0" during the absence of bail-off.

13. The enhanced electropneumatic bail-off system as defined in claim 11, wherein said freight/passenger mode terminal exhibits a logical "1" during freight operation and exhibits a logical "0" during passenger operation.

14. The enhanced electropneumatic bail-off system as defined in claim 11, wherein said brake pipe indication terminal supplies a brake pipe pressure signal.

15. The enhanced electropneumatic bail-off system as defined in claim 11, wherein said emergency brake terminal exhibits a logical "1" during the presence of an emergency brake and exhibits a logical "0" during the absence of an emergency brake.

16. The enhanced electropneumatic bail-off system as defined in claim 15, wherein the appearance of the logical "1" on said emergency brake terminal inhibits said recoverable bail-off logic circuit.

17. The enhanced electropneumatic bail-off system as defined in claim 15, wherein the appearance of a logical "0" on said emergency brake terminal inhibits said direct release and nonrecoverable bail-off logic circuit.

* * * * *